US008468547B2

(12) United States Patent
LeFebvre et al.

(10) Patent No.: US 8,468,547 B2
(45) Date of Patent: Jun. 18, 2013

(54) METHOD AND SYSTEM FOR SYNCHRONIZING THREAD WAVEFRONT DATA AND EVENTS

(75) Inventors: Laurent LeFebvre, Mascouche (CA); Michael Mantor, Orlando, FL (US); Deborah Lynne Szasz, Chuluota, FL (US)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 273 days.

(21) Appl. No.: 12/953,367

(22) Filed: Nov. 23, 2010

(65) Prior Publication Data

US 2012/0131596 A1  May 24, 2012

(51) Int. Cl.
*G06F 13/00*  (2006.01)
(52) U.S. Cl.
USPC ........... 719/314; 719/318; 718/102; 711/155; 712/220

(58) Field of Classification Search
USPC .... 719/314, 318; 718/102; 711/155; 712/220
See application file for complete search history.

(56) References Cited

U.S. PATENT DOCUMENTS

| 7,627,723 | B1* | 12/2009 | Buck et al. | 711/155 |
| 7,814,243 | B2* | 10/2010 | Hamilton | 710/52 |
| 8,271,996 | B1* | 9/2012 | Gould et al. | 719/312 |
| 2003/0182503 | A1* | 9/2003 | Leong et al. | 711/114 |

* cited by examiner

*Primary Examiner* — Andy Ho
(74) *Attorney, Agent, or Firm* — Sterne, Kessler, Goldstein & Fox P.L.L.C.

(57) ABSTRACT

Systems and methods for synchronizing thread wavefronts and associated events are disclosed. According to an embodiment, a method for synchronizing one or more thread wavefronts and associated events includes inserting a first event associated with a first data output from a first thread wavefront into an event synchronizer. The event synchronizer is configured to release the first event before releasing events inserted subsequent to the first event. The method further includes releasing the first event from the event synchronizer after the first data is stored in the memory. Corresponding system and computer readable medium embodiments are also disclosed.

22 Claims, 10 Drawing Sheets

METHOD AND SYSTEM FOR SYNCHRONIZING THREAD WAVEFRONT DATA AND EVENTS

BACKGROUND OF THE INVENTION

1. Field of the Invention

The present invention relates generally to data processing by concurrent processes on multiple processing units.

2. Background Art

In many applications, such as graphics processing, protein folding, encryption/decryption, video encoding/decoding, and the like, a sequence of threads process one or more data items in order to output a final result. In many modern parallel processors, for example, several single instruction multiple data (SIMD) processors concurrently execute sequences of groups of threads. Typically, the concurrently executing threads are identical (i.e., have the identical code base), and the thread sequences executed on the respective SIMD processors are also the same. A plurality of identical concurrent threads that are executed on separate processors is known as a thread wavefront.

When processing using a sequence of thread wavefronts, a first thread wavefront typically retrieves data from memory, performs some arithmetic processing upon the retrieved data, and then writes the processed data back into the memory. A second thread wavefront, typically executing on the same processor(s), can then retrieve the data written to memory by the first thread wavefront and perform further processing. However, if the data written by the first thread wavefront is not in the memory at the time that the data is required by the second thread wavefront, the second thread wavefront may not be able to proceed as intended and thus has to wait until the required data is in memory. This results in a wavefront stall.

In conventional parallel processing systems, for example, the threads of the second wavefront can each poll memory and wait for the data from the first wavefront to be available in the memory. Delays in writing data to the memory by a first wavefront can result in frequent and repetitive polling by a second wavefront requesting that data. Such frequent and repetitive polling can consume substantial portions of memory bandwidth and can also increase the memory footprint of synchronization buffers. The resulting reduction in available memory bandwidth and the increased memory footprint of the synchronization buffers can lead to further performance inefficiencies.

What are needed, therefore, are methods and systems to improve synchronization of thread wavefronts so that wavefront stalls can be reduced or eliminated.

BRIEF SUMMARY OF EMBODIMENTS OF THE INVENTION

Systems and methods for synchronizing thread wavefronts and associated events are disclosed. Events can include tokens or other messages generated by one or more threads in a wavefront to be communicated to other threads, wavefronts, or processing modules. According to an embodiment, a method for synchronizing one or more thread wavefronts and associated events includes inserting a first event associated with a first data output from a first thread wavefront into an event synchronizer. The event synchronizer is configured to release the first event before releasing events that are inserted subsequent to the first event. The method further includes releasing the first event from the event synchronizer after the first data is stored in the memory. By ensuring that the first event is released before events that are subsequently inserted into the event synchronizer, and by further ensuring that the first event is released from the event synchronizer after the first data is stored in the memory, the embodiment synchronizes a plurality of wavefronts in a manner that reduces or eliminates wavefront stalls.

Another embodiment is a system for synchronizing one or more thread wavefronts and associated events. The system includes a shader core, a wave event generator, an event synchronizer, and a switch coupled to the shader core and a memory. The shader core comprises a plurality of processing units configured to execute a first wavefront outputting a first data. The wave event generator is coupled to the shader core, and is configured to generate a first event associated with the outputting of the first data. The event synchronizer is configured to release the first event before releasing events inserted subsequent to the wave event. The switch is coupled to the shader core and a memory. The switch is also configured to insert the first event into the event synchronizer, and release the wave event from the event synchronizer after the first data is stored in the memory.

Yet another embodiment is a computer readable media storing instructions. The instructions, when executed, are adapted to synchronize one or more thread wavefronts and associated events using a method that includes inserting a first event associated with a first data output from a first thread wavefront into an event synchronizer, where the event synchronizer is configured to release the first event before releasing events inserted subsequent to the first event. The method also includes releasing the first event from the event synchronizer after the first data is stored in the memory.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF EMBODIMENTS OF THE INVENTION

Embodiments of the present invention are directed to the design of data processing systems with improved synchronization of thread wavefront events and data. For example, in one embodiment, a processor with a plurality of processing units is configured to process data such as pixel data using a sequence of thread wavefronts. The shader core of the processor, in the said embodiment, includes eight SIMD processing units that concurrently execute threads of the sequence of wavefronts. The manner in which the data and corresponding events maintain synchronization, and the manner in which the data and corresponding events are made available to thread wavefronts can result in substantial gains in data processing efficiencies.

Graphics or other compute processing frequently requires the processing of data, such as pixel data, using a sequence of threads or a sequence of thread wavefronts. An example sequence of thread wavefronts can include a vertex shader thread wavefront, a geometry shader thread wavefront, and a pixel shader thread wavefront, invoked in that order, to process data to produce a graphic output. When processing data using a sequence of thread wavefronts, for example, as in many modern graphics processors, a significant factor affecting performance efficiency is the time during which the wavefronts, or the corresponding threads, idle due to the unavailability of data to process. The unavailability of the data can be due to one or more reasons, such as, the data from the previous wavefront not being completely written to the memory from which a second wavefront is configured to read from, and/or one or more threads from the previous wavefront not having completed execution related to that data. In addition, delays in data being written to memory can occur due to blocking issues in writing to memory.

Stalling the second thread wavefront, or stalling one or more threads of the second thread wavefront, for data to be available can slow the processing of the entire system. In embodiments of the present invention, the system is designed such that events according to which thread wavefronts are executed are synchronized with the data produced and consumed by the wavefronts. In embodiments of the present invention, a signal can be sent to a second thread wavefront explicitly indicating that the corresponding data is available for reading in the memory.

Embodiments of the present invention are described herein primarily in relation to graphics processing. However, the teachings of this disclosure are applicable to any parallel processing environment, including, but not limited to, graphics processing applications, protein folding algorithms, encryption/decryption, video encoding/decoding, and like applications.

Figure 1:
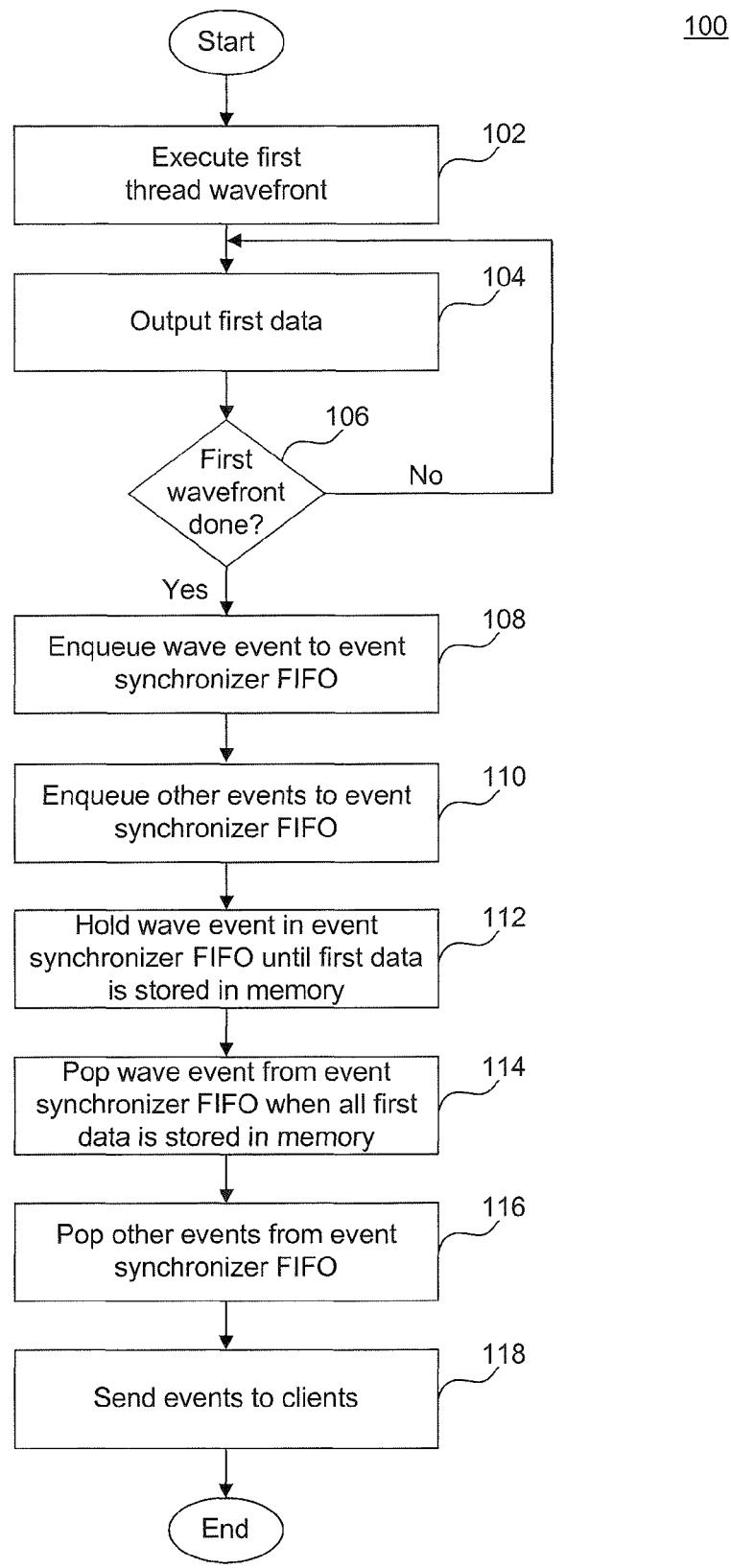
FIG. 1 is a flowchart of a method to synchronize thread wavefront events and data, according to an embodiment of the present invention.

FIG. 1 is a flowchart of a method 100 for synchronizing thread wavefront events and data, according to an embodiment of the present invention. Method 100 can, for example, be implemented to write data output from a thread wavefront executing on a shader core having a plurality of shader processors to a destination memory. The destination memory is a shared memory accessed by wavefronts to obtain their data. Destination memory can be shared memory in a graphics processing card or system shared memory. A second thread wavefront can then read the data from the destination memory.

In step 102, a first thread wavefront is executed in a shader core. According to an embodiment, the first thread wavefront is executed on a shader core that includes a plurality of SIMD processing units. According to an embodiment, the first thread wavefront can comprise of vertex shader (VS) threads to process a set of primitives. In some graphics applications, vertex shaders are used to transform each input vertex's 3D position to a corresponding 2D position that can be displayed on a screen. The output of the vertex shader is generally used by a geometry shader or rasterizer.

In step 104, the first thread wavefront outputs data. For example, the output data can be the 2D positions for each respective 3D vertex that was subjected to processing by the vertex shader. The output of the first thread wavefront (e.g., vertex shader) is subsequently read from destination memory by a second thread wavefront (e.g., geometry shader or rasterizer). The output data is written to a corresponding shader export module that is communicatively coupled to the shader processing units.

In step 106, it is determined whether the first thread wavefront has completed execution. More particularly, it is determined if the first thread wavefront has completed outputting of data. If not, processing returns to step 104.

If the first thread wavefront has completed its data output, then in step 108, a wave event is input to an event synchronizer. The wave event can be an event with a predetermined format that is used to indicate the completion of the execution of a particular wavefront. The wave event can include a wave identifier identifying a particular wavefront as one of its fields. An event, as used in this disclosure, can be a token or other message that can be sent between modules to enforce synchronization, flush caches, report status to host applications, or for other predetermined purposes.

The event synchronizer can comprise one or more event synchronizing structures. According to an embodiment, event synchronizer comprises FIFO event queues in one or more shader export modules and a FIFO event queue in a switch, such as a crossbar switch.

In step 110, other events that occur later in time than the wave event corresponding to the first thread wavefront are input to the same event synchronizer as the one to which the wave event was input. The other events can include events that flush caches to remove data related to the first thread wave front, events that report status of the first thread wavefront to the command processor, and the like.

In step 112, an ordering of the events in the event synchronizer is enforced. According to an embodiment, an ordering of events is enforced such that other events that occurred later than the wave event corresponding to the first thread wavefront are not released until after the wave event is released. For example, the event synchronizer can be implemented as one or more first-in-first-out (FIFO) queues. According to the embodiment, the wave event is held in the event synchronizer as long as any of the data output by the first wavefront remains without being written into destination memory from where that data is available to be read by other threads. The determination as to whether any data from the first thread wavefront remains without being written to destination memory, can be made by comparing the wave identifier associated with data in the data buffers between the interface to the shader core and the interface to the destination memory. According to an embodiment, a shader export module and a switch, such as a crossbar switch, can be placed between the interface to the shader core and the interface to the destination memory.

In step 114, the wave event is released when it is determined that all the data associated with the first thread wavefront has been written to destination memory. As described above, this determination can be made by comparing the wave identifier of the current wave event in the event synchronizer and the wave identifiers of the data in buffers that are to be written to the destination memory or to be further processed.

After the wave event is released, other events that occurred after the wave event can be released in step 116. If a second wave event (corresponding to another wavefront) is in the event synchronizer, the other events are released only upto and not including the second wave event. The release of the other events can trigger further processing in the system, for example, by subsequent thread wavefronts to read the data output by the first thread wavefront from destination memory.

In step 118, the wave event and/or other events are sent to client modules, as appropriate. According to an embodiment, one or more client modules, such as the sequencer (SQ), vertex grouper and tesselator (VGT), and command processor (CP) register to receive one or more event types. Each event released from the event synchronizer can be distributed to one or more client modules that are designated to receive the event.

The method 100, as illustrated by steps 102-118, can be used to ensure the wave event corresponding to the first thread wavefront is synchronized with the corresponding data of the first thread wavefront from the output of the data from the shader core to the writing of that data to the destination memory.

Figure 2:
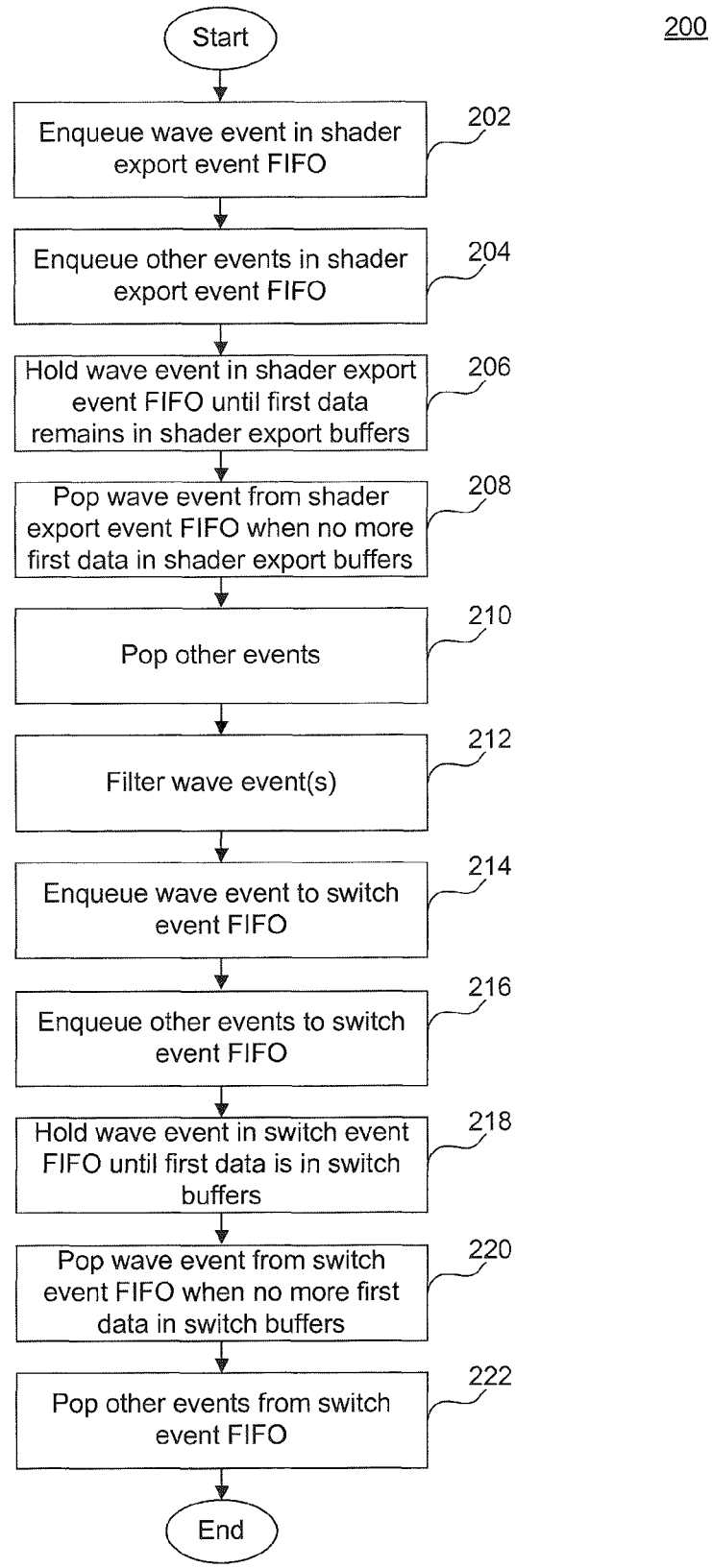
FIG. 2 is a flowchart further illustrating the method of FIG. 1, according to an embodiment of the present invention.

FIG. 2 illustrates further details of the method 100. In particular, FIG. 2 illustrates a method 200 by which the wave event is sent through a shader export module and a switch in synchronization with the corresponding data to be written to a destination memory.

In step 202, the wave event associated with the first wavefront is enqueued in an event FIFO in a shader export module. The shader export module, for example, can be coupled to the output of the shader core. The data output by the first thread wavefront is written to shader export buffers in the shader export module. The shader export event FIFO includes the functionality to enqueue incoming wavefront events such as wave event, cache flush events, and command processor notification events. The wave event that is enqueued to the shader export event queue can be a wave event corresponding to the completion of processing of the first thread wavefront. The shader export event FIFO also includes the functionality to enforce a FIFO ordering of the events enqueued to it.

In step 204, other events, if any, that occur later in time than the wave event are enqueued to the shader export event FIFO. Other events can include flush events and events to notify the command processor. By enqueuing all events affecting the processing of the thread wavefronts to the same one or more event FIFO's (i.e., in embodiments, there may be more than one shader export module, each having its own event FIFO and associated structures and logic), embodiments of the present invention facilitates the enforcing of a strict ordering or sequencing between wave events and other events.

In step 206, the wave event associated with the first thread wavefront is held in the shader export event FIFO until all data output from the first thread wavefront has exited the shader export module. For example, a switch connecting the shader export module to a destination memory, such as the crossbar switch illustrated in FIG. 8, retrieves data from the shader export memory buffers and sends to the destination memory. The check for whether any data output by the first thread wavefront remains in the shader export memory buffers can be done by comparing the wave identifier of the wave event at the top (i.e., next event to be released) of the FIFO and the wave identifiers associated with the data in each of the shader export memory buffers.

In step 208, when it is determined that no data with a wave identifier matching the wave identifier of the wave event at the top of the FIFO exists in the shader export module, the wave event is released from the shader export event FIFO.

Subsequent to releasing the wave event corresponding to the first thread wavefront from the shader export event FIFO, other events, if any, that occur later in time than the wave event are released from the shader export event FIFO in step 210.

In step 212, filtering of the events can be performed in instances where more than one shader export module is generating events to be input to the switch coupled to the shader export modules. The filtering can ensure that only one wave event corresponding to the first thread wavefront is enqueued to the switch. Similarly filtering can also ensure that other duplicative events corresponding to the same wavefront are combined into a single event before being enqueued to the switch.

In step 214, the wave event corresponding to the first thread wavefront is enqueued to an event FIFO in the switch. According to an embodiment, the enqueued wave event is a filtered wave event. According to an embodiment, the switch is a crossbar switch such as the one illustrated in FIG. 8. The switch event FIFO includes the functionality to enqueue a plurality of events and to enforce a FIFO ordering discipline.

In step 216, other events that occur at later times than the wave event are enqueued to the event FIFO. As described above, the wave event and other events that are enqueued to the switch event FIFO are those that were earlier enqueued and released from the one or more shader export event FIFOs in the shader export modules.

In step 218, the wave event corresponding to the first thread wavefront is held in the switch event FIFO until all data in the switch that are data output from the first thread wavefront have exited the switch, e.g., been written to destination memory. As described above, the data output by the first thread wavefront are first stored in the shader export memory buffers and then transferred to the memory buffers in the switch. One or more memory controllers that are coupled to the switch then transfer the data from the memory buffers of the switch to the destination memory.

Holding of the wave event in the switch event FIFO until all data corresponding to the first thread wavefront have exited the switch can be performed by comparing timestamps associated with the wave event at the top of the switch event FIFO and any data that is in the switch memory buffers. According to an embodiment, upon entry to the switch events as well as data are timestamped. This timestamp can then be used to determine if any data that preceded the wave event still exists in the switch when the wave event is at the top of the switch event FIFO.

When there are no more data in the switch buffers corresponding to the first thread wavefront, the wave event can be released from the switch event FIFO in step 220. Subsequently, in step 222, other events, if any, which occur later in time than the wave event are released from the switch event FIFO.

As described above with respect to method 100, the wave events and any other events released from the event synchronizer can be sent to one or more clients that have been configured to receive the events.

Figure 3:
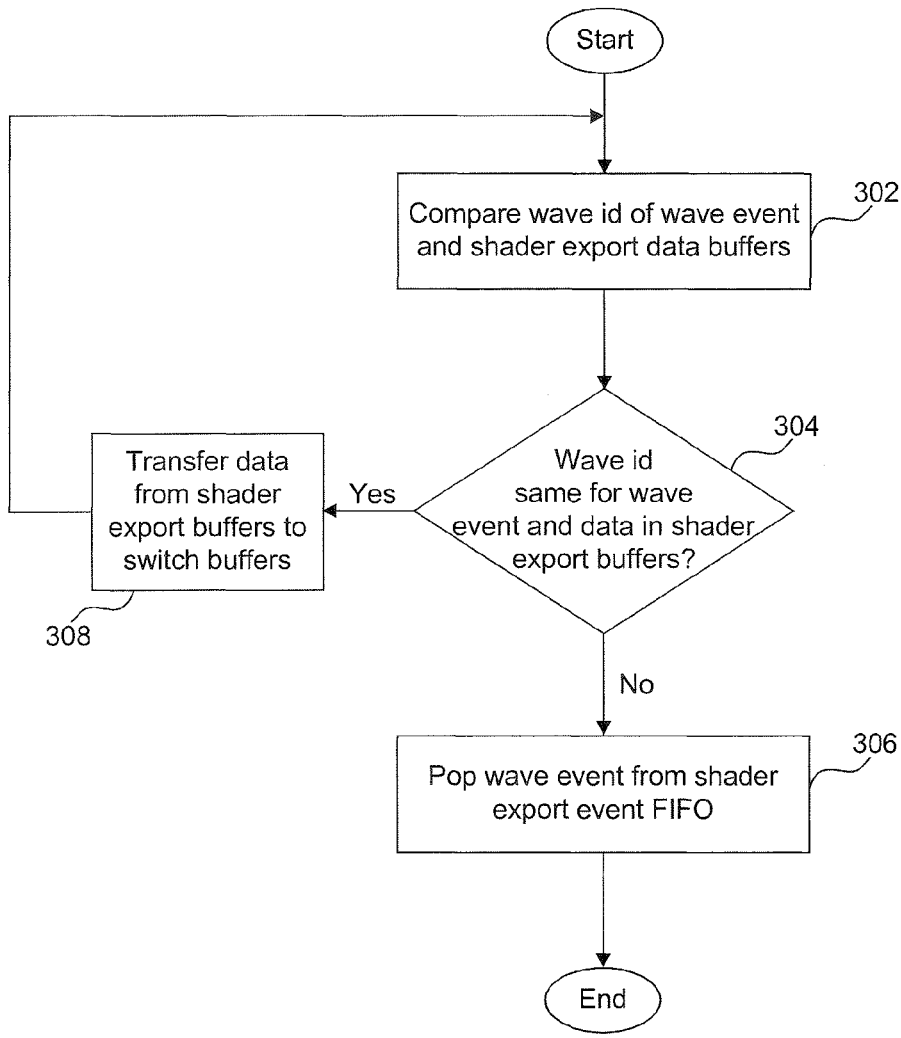
FIG. 3 is a flowchart illustrating a method of synchronizing thread wavefront events and data in a shader export module, according to an embodiment of the present invention.

FIG. 3 illustrates a method 300 for synchronizing thread wavefront data and events in a shader export module, according to an embodiment of the present invention. Method 300 can, for example, be used to synchronize data and events output by shader core and received by a shader export module. As described before, a thread wavefront executing on a plurality of shader processing units output data that is received in a shader export module and stored in memory buffers there. At the completion of the thread wavefront, a wave event is generated for input to an event FIFO in a shader export module.

In step 302, the wave identifier associated with a wave event, for example, the wave event associated with the first thread wavefront, at the top of the shader export event FIFO is compared to the wave identifiers of data stored in each of the shader export data buffers. Prior to this comparison, data output from the first thread wavefront is attached with a wave identifier (if the wave identifier is not already attached to the data) and is input to preallocated shader export memory buffers.

Figure 8:
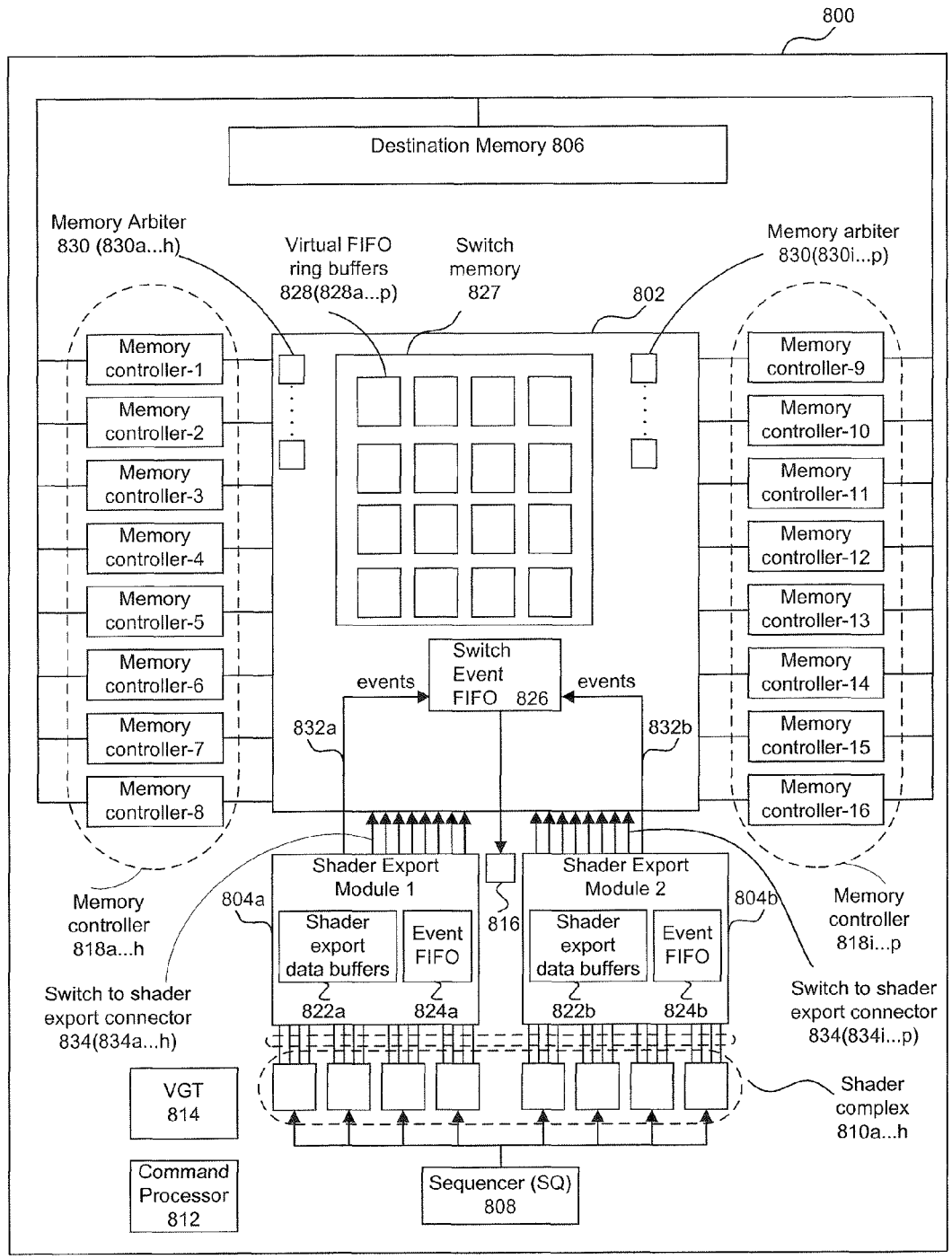
FIG. 8 is a block diagram of a system for synchronizing thread wavefront events and data, according to an embodiment of the present invention.

In step 304, a determination is made as to whether the wave identifiers of the wave event at the top of the shader export event FIFO is matched by any of the data in the shader export memory buffers. If a match is found, then in step 308, no events are released from the shader export event FIFO, and the transfer of data from the shader export memory buffers into the switch to be subsequently stored in destination memory continues. As described above, according to an embodiment, a crossbar switch such as that shown in FIG. 8, is used to interconnect the shader export modules with a destination memory.

If there is no match in the shader export memory buffers for the wave event at the top of the shader export event FIFO, then all of the data associated with the thread wave front that generated the wave event has been transferred out of the shader export module. Therefore, when there is no match for the wave event in the data, processing of method 300 proceeds to step 306. In step 306, the shader export event FIFO is popped to release the wave event. For example, in step 306, the wave event associated with the first thread wavefront can be released. After the wave event is released, other events that were enqueued to the event FIFO after the wave event can be released. In this manner, it is ensured that the data output from the first thread wavefront has been completely transferred out of the shader export module before any of the events associated with operations that make use of that data is released from the shader export module.

Figure 4:
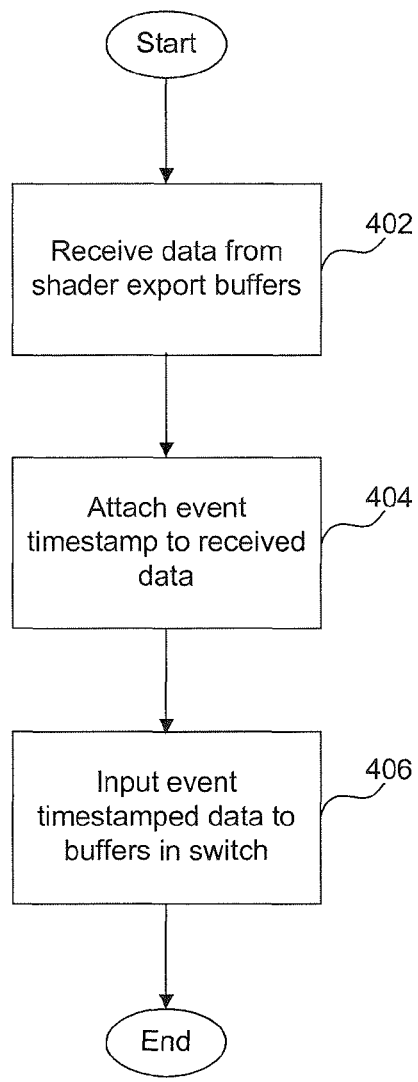
FIG. 4 is a flowchart illustrating a method for time stamping of data input to a switch, according to an embodiment of the present invention.
Figure 5:
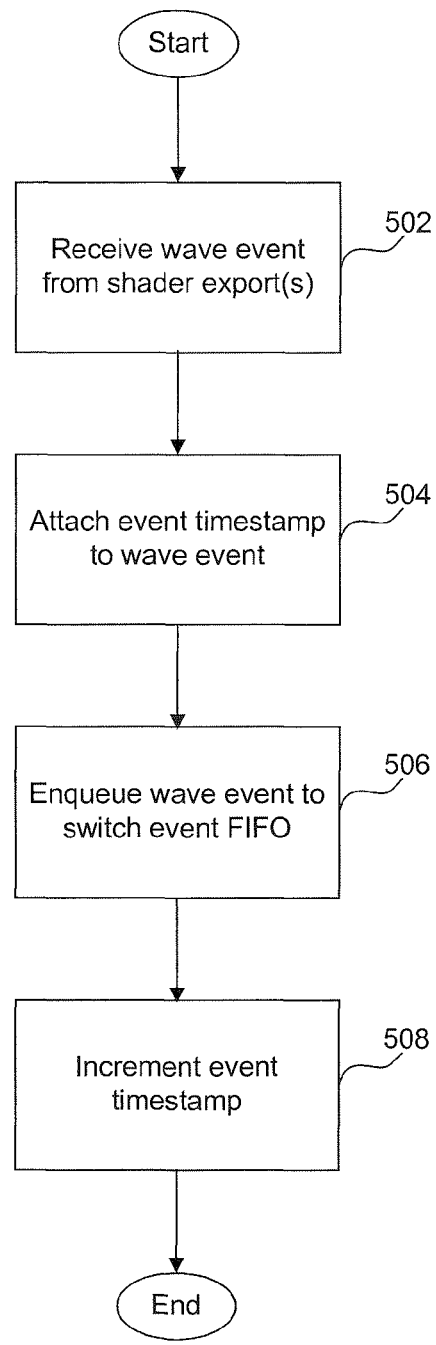
FIG. 5 is a flowchart illustrating a method for time stamping of events input to a switch, according to an embodiment of the present invention.

FIGS. 4 and 5 illustrate methods 400 and 500 that, respectively, timestamp events and data that enter a switch that couples the shader export modules to a destination memory. As described below in relation to FIG. 10, the switch can include a event timestamping device that yields the timestamps utilized in methods 400 and 500. According to an embodiment, methods 400 and 500 can be performed by processing logic residing in the switch.

In step 402, the data from the shader export memory buffers is received at the switch. In step 404, the current value of the event timestamp counter is attached to each data item entering the switch. For example, each data item that is to be buffered in the switch can be attached the timestamp value. The event timestamping device includes a running count that is used as the event timestamp. The purpose of the event timestamp is to provide a identifier that, at any instant during the operation of the system, can uniquely associate data output by a particular thread wavefront with at least the wave event associated with that thread wavefront.

In step 406, the timestamped data is stored in buffers in the switch. The switch buffers store the data until it can be transferred out to destination memory, for example, by a memory controller. According to an embodiment, and as described in relation to FIG. 8 below, the data buffers in the switch can be configured as a plurality of logical ring buffers. The data incoming from the shader export module are enqueued to these logical ring buffers based on the memory destination of the incoming data. The logical ring buffers are then processed by switching logic that transfer the data from the logical ring buffers to the appropriate memory destination through a memory controller.

In method 500, a wave event associated with a particular thread wavefront is received at the switch in step 502. For example, the wave event associated with the first thread wavefront can be received at the switch from the shader export event FIFO.

In step 504, the current value of the event timestamp counter is attached to the wave event. As noted above in relation to method 400, the event timestamping device in the switch includes a running count that is used as the event timestamp.

In step 506, the timestamped wave event is enqueued in the switch event FIFO. The switch event FIFO, as described above, includes the functionality to enqueue events associated with thread wavefronts and the functionality to enforce a FIFO ordering discipline.

In step 508, the event timestamp counter is incremented. Thus, the event timestamp counter is incremented each time after a wave event is timestamped. In this manner, all data associated with a particular wavefront are tagged with a timestamp that is less or at least the same in value as that of the wave event associated with that thread wavefront.

Figure 6:
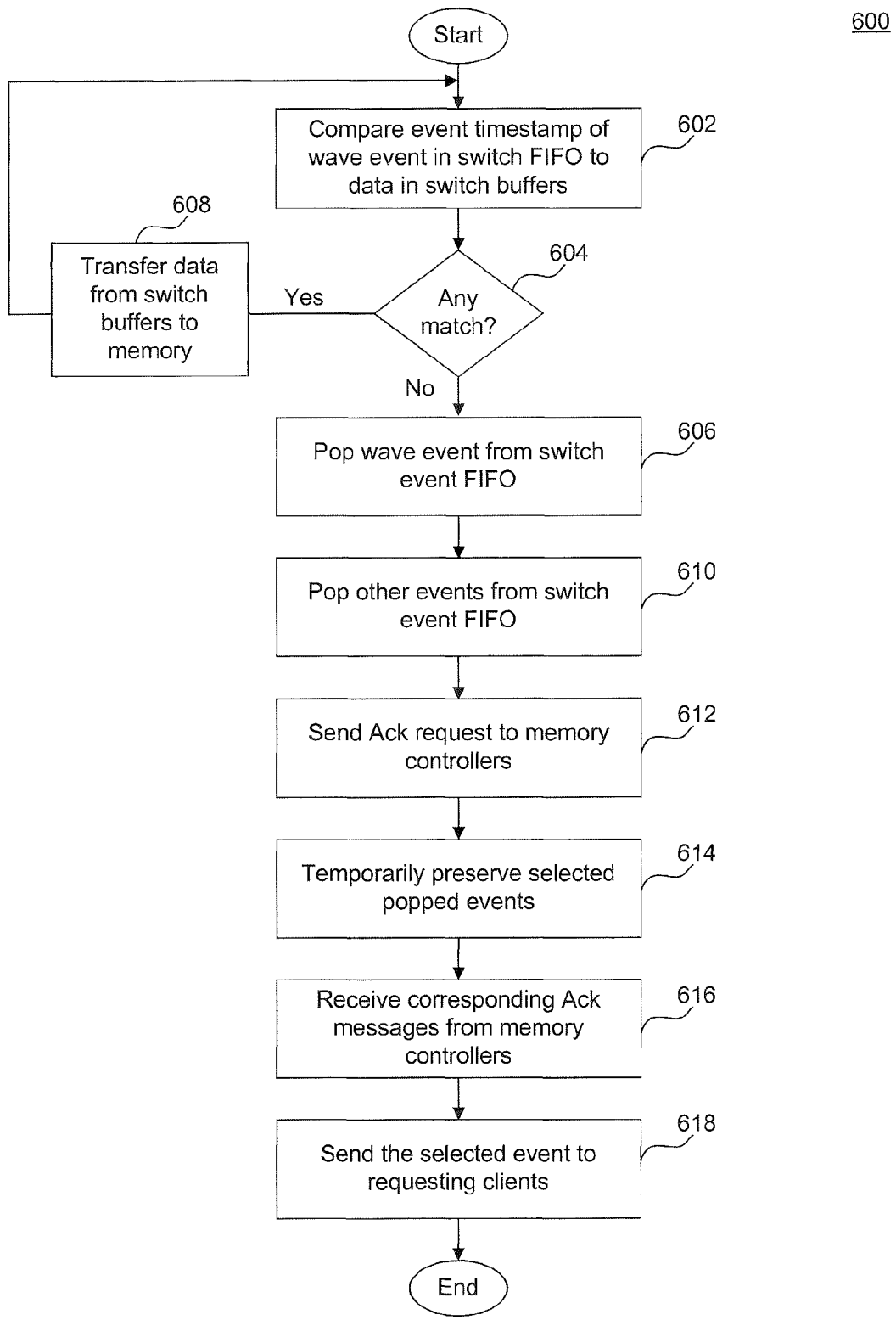
FIG. 6 is a flowchart illustrating a method for synchronizing of events sent to client modules with the writing of data to a memory, according to an embodiment of the present invention.

FIG. 6 illustrates a method 600 for synchronizing thread wavefront data and events in a switch, such as the crossbar switch shown in FIG. 8. Method 600 can, for example, be performed by logic located in the switch.

In step 602, the timestamp of the wave event at the top of the switch event FIFO is compared to the timestamps of the data in the memory buffers of the switch. According to an embodiment, the comparison is made with the data element at the top of each logical ring buffer that constitutes a switch buffer in the crossbar switch coupling one or more shader export modules to a destination memory. The timestamps of the events and the data can be attached as described above in relation to methods 500 and 400, respectively. The comparison can be performed on each clock cycle or a multiple thereof.

In step 604, a determination is made as to whether a match exists with respect to the timestamp of the wave event at the top of the switch event FIFO. If a match exists, it indicates that data output by the thread wavefront associated with the wave event at the top of the switch event FIFO is still in the switch memory buffers, and therefore it is premature to release the wave event from the event FIFO. Therefore, in the event that a match exists, processing proceeds to step 608 in which the switching logic continues to transfer data from the switch memory buffers to the destination memory, and no events are released from the event FIFO.

If no match is found in step 604, then it is an indication that all the data output by the thread wavefront associated with the wave event at the top of the switch event FIFO has been transferred out to destination memory from the switch. Therefore, when there is no match of the wave event timestamp, in step 606, the wave event is popped or released from the switch event FIFO.

In step 608, after the wave event is released, other events, if any, that occur later in time than the wave event can be released from the switch event FIFO.

According to an embodiment, in step 610, acknowledgement requests are sent to each memory controller requesting the respective memory controller to notify the switch when all data associated with an indicated timestamp have been transferred out from switch memory buffers in its control to a destination memory. According to an embodiment, each logical ring buffer in the switch is associated with a respective memory controller that is responsible for storing data in a predetermined area of destination memory. Upon receiving the acknowledgment requests from the switch, each memory controller notes the timestamp associated with the request and monitors the switch memory buffers in its control and any other buffers the data traverses before finally being written to destination memory. According to an embodiment, the acknowledgement request can be broadcast to be received by all the memory controllers of the switch.

In step 614, selected events that are released from the switch event FIFO are temporarily preserved. According to an embodiment, the events can be preserved in another queue data structure such as a FIFO queue, or other data structure that allows out of order access. The purpose of temporarily preserving events released from the switch event FIFO is to have the event information available until confirmation is received from the memory controllers that the associated data has been written to the destination memory.

In step 616, the acknowledgement messages from the memory controllers are received at the switch. According to an embodiment, each memory controller receiving the acknowledgement request monitors its buffers for the indicated timestamp. When each memory controller determines that no more data associated with a specified timestamp is in any of the buffers monitored by it, it sends an acknowledgment message back to the switch. The acknowledgment message can include the timestamp and an indication of the event for which the acknowledgement was sought.

In step 618, the acknowledgement messages received from the memory controllers are processed. According to an embodiment, the switch waits for all memory controller to return the acknowledgment message. When the switch has determined the status of each memory controller with respected to the acknowledgment request, the switch then proceeds to release the corresponding event from the data structure in which the event was temporarily stored. In step 618, the corresponding event can be sent to one or more client modules that are designated to receive the event. For example, the event can be sent to one or more of a sequencer, VGT, or command processor.

Figure 7:
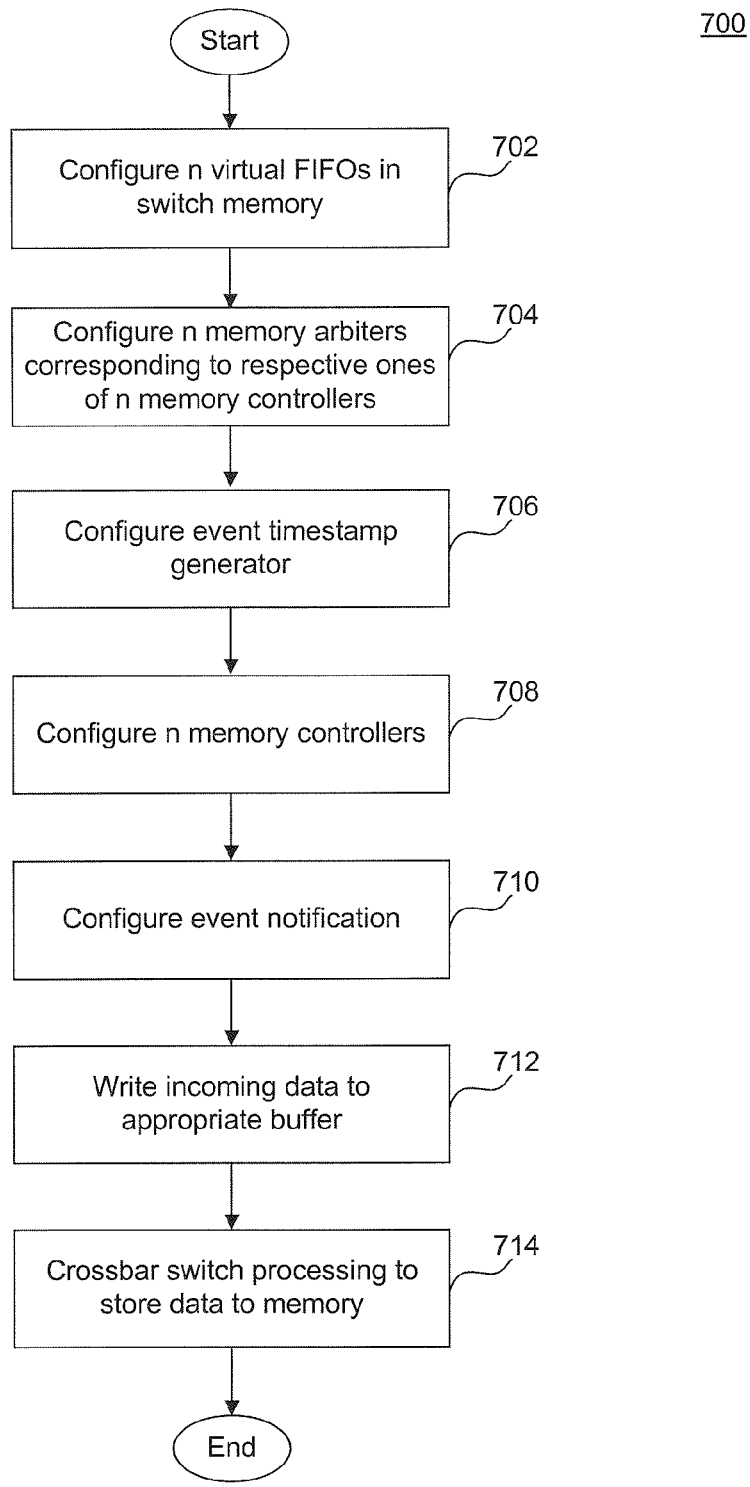
FIG. 7 is a flowchart illustrating a method for configuring a switch, according to an embodiment of the present invention.

FIG. 7 illustrates a method 700 to configure a crossbar switch that can be used in transferring the output of thread wavefronts to a destination memory. According to an embodiment, the crossbar switch couples one or more shader export modules to a destination memory. A crossbar switch, according to an embodiment of the present invention, is illustrated in FIG. 8.

In step 702, n logical ring buffers are configured in the crossbar switch. The logical ring buffers can be configured as FIFO ring buffers or according to another queuing discipline. According to an embodiment, a physical memory area in the switch is logically structured into 16 logical FIFO ring buffers. According to another embodiment, the logical FIFO ring buffers are configured across two or more physically separated switch memories. According to an embodiment, one logical ring buffer is created for each memory controller. The logical ring buffers are for storing data. For example, the output of thread wavefronts that are received at the switch from a shader export module are stored in an appropriate logical ring buffer.

In step 704, n memory arbiters are configured. According to an embodiment, one memory arbiter is configured for each memory controller. A memory arbiter is configured to, at intervals, check all logical ring buffers for data that are to be sent through the associated memory controller and accordingly coordinate access to memory to write that data. Checking a logical ring buffer can require the memory arbiter to access a single memory area in the switch or two or more physically separate memory areas in configurations where each ring buffer spans two or more separate memory areas in the switch.

In step 706, an event timestamp generator is configured. The event timestamp generator is configured to include a running count, for example, of the wave events received from the shader export module coupled to the switch. The event timestamp generator can be configured to timestamp incoming data and events with its current value, and increment after a wave event is received and timestamped with the current value.

In step 708, n memory controllers are configured. Each memory controller is configured to access a particular area of the destination memory. Each memory controller has a corresponding memory arbiter that, as described above, coordinates the access to the one or more switch memory areas for the corresponding logical ring buffer.

In step 710, the event notification devices are configured. For example, a destination client selector (such as module 1016 shown in FIG. 10) can be configured with a mapping of clients and any settings for the events to be sent to those clients.

In step 712, the data incoming from a shader export module is written to the appropriate logical ring buffer in the switch. Based on the destination memory address of the data, a corresponding logical ring buffer is selected for writing the data. Each interface from the shader export module is connected to all logical ring buffers. In this manner, data incoming on any interface from the shader complex can be written to any logical ring buffer, and therefore can be subsequently stored to any location in destination memory.

In step 714, the crossbar switch processes the data from its logical ring buffers in order to send the data to the corresponding memory controller, and from the memory controller to the destination memory. According to an embodiment, on every clock cycle, data from each of the logical ring buffers can be transferred to a memory controller.

FIG. 8 illustrates a system 800 configured to synchronize thread wavefront events and data, according to an embodiment of the present invention. System 800 comprises a crossbar switch 802, one or more shader export modules 804, a destination memory 806, one or more sequencers (SQ) 808, a shader core 810 comprising one or more shader processing units, a command processor 812, a vertex grouper and tesselator (VGT) 814, an event distribution module 816, and a plurality of memory controllers 818.

Crossbar switch 802 includes the functionality to receive data and events from the shader export modules 804 and perform a switching algorithm to transfer the data out to a destination memory 806 through memory controllers 818. According to an embodiment, crossbar switch 802 provides a 16×16 switching matrix. For example, crossbar switch 802 includes 16 interfaces 834 to shader export modules 804 and 16 interfaces to memory controllers 818.

Crossbar switch 802 also includes a plurality of logical ring buffers 828 configured in a switch memory area 827, a plurality of memory arbiters 830, and an event FIFO 826. In an embodiment, switch memory area 827 is a single physical memory area. In another embodiment, switch memory area 827 includes two or more physically separate memory areas. The logical ring buffers 828 can be configured as FIFO ring buffers or according to another queuing discipline. According to an embodiment, logical ring buffers 828 includes 16 logically separate ring buffers 828a-828p. Each logical ring buffer 828a-828p is configured to store data addressed to an area of memory accessed by one of the memory controllers 818. Each ring buffer 828a-828p is configured to enforce a FIFO queue discipline. Logical ring buffers 828 are for storing the data incoming from the shader export modules until such time that the switching logic can transfer that data out to the memory controllers.

The data from the shader export modules 804 can be received over interfaces 834. According to an embodiment, crossbar switch 802 is coupled to two shader export modules 804a and 804b, with 8 interfaces 834a-834h connecting the switch to shader export module 804a, and another 8 interface 834i-834p connecting the switch to shader export module 804b. In addition, interfaces 832a and 832b couple the crossbar switch, or more particularly, the switch event FIFO 826, to shader export modules 804a and 804b, respectively. Interfaces 832a and 832b are used for exchanging events and interfaces 834 are used to exchange data between the crossbar switch 802 and shader export modules 804a and 806.

According to an embodiment, crossbar switch 802 includes 16 memory arbiters 830a-830p. Each memory arbiter includes the functionality to coordinate the access to memory for one of the memory controllers 818. For example, according to an embodiment, one memory arbiter 830a-830p is paired with a corresponding memory controller 818a-818p. Memory arbiter 830a can, for example, coordinate access to memory 806 for memory controller 818a and coordinate access by memory controller 818a to its designated logical ring buffer 828a. Memory arbiter 830a, for example, may be required to coordinate physical access on behalf of memory controller 818a to a limited number of interfaces to destination memory 806 as well as memory in switch 802 which has been logically separated to the FIFO rings 828.

According to an embodiment, each memory controller 818a-818p is configured to access a predetermined portion of the destination memory 806. One or more memory controllers may access a particular area of memory. As described above, the switching logic enqueues data destined for a particular area of destination memory to the logical ring buffer associated with the memory controller associated with that area of destination memory.

Switch memory 827 is accessible by each of the shader export module connectors 834 and by each of the memory arbiters 830. Each shader export module connector 834 is configured to be able to write to any of the logical ring buffers 828. Also, each memory arbiter 830 is configured to be able to read from any of the logical ring buffers 828.

Switch event FIFO 826 includes the functionality to receive events, such as wave events associated with thread wavefronts and other events from the shader export modules 804, and enforce a FIFO queuing discipline upon the received events. The switch event FIFO 826 enforces a FIFO queuing discipline such that no events generated after a particular wave event is released from the FIFO until that wave event is released. The wave event is not released until all the data associated with the wave event, or more particularly, all the data associated with the thread wavefront have been transferred out of the logical ring buffers 828 that hold data within switch 802.

Each shader export module 804 includes a shader export data buffer (shown as 822a in shader export module 804a, and 822b in shader export module 804b) and a shader export event FIFO (shown as 824a in shader export module 804a, and 824b in shader export module 804b). Shader export data buffers 822a and 822b provide memory within the shader export module to store data being exchanged between the shader processing units and a memory, such as destination memory 806. For each thread wavefront, for example, a portion of the shader export data buffers can be allocated for storing the output data. Shader export event FIFOs 824a and 824b include the functionality to enqueue events from the sequencers, shader processing units, or other modules, relating to thread wavefronts and to enforce a FIFO queuing discipline. Each shader export module 804 is coupled to one or more shader processing units. According to an embodiment, shader export module 804a is coupled to shader processing units 810a-810d, and shader export module 804b is coupled to shader processing units 810e-810h. Each shader processing unit can be coupled to a shader export module with 4 32-bit communication paths. Each shader processing unit 810a-810h can comprise one or more SIMD processors and can include the processing capabilities for a graphics processing pipeline.

According to an embodiment, one or more sequencers 808 issues commands and/or events related to the processing of data to the shader processing units 810a-810h. Shader processing units 810a-810h execute thread wavefronts, such as wavefronts comprising of vertex shaders, fetch routines, geometry shaders, compute shaders, pixel shaders, or other types of threads for processing data. The data output from one thread wavefront is written to a destination memory, such as destination memory 806, from where a subsequent thread wavefront can read the data as input. The data output from the shader processing units traverse the respective shader export module 804 and crossbar switch 802 before being stored in destination memory 806. Embodiments of the present invention are directed to synchronizing the data output by various thread wavefronts with associated events. In addition to outputting processed data, the sequencers and/or the shader processing units can also send events associated with particular thread wavefronts to the shader export modules. The events can then be used to synchronize the data through the shader export modules and the crossbar switch.

Data output from thread wavefronts executing on shader core 810 are input to shader export data buffers 822a and 822b, and related events including wave events are enqueued to event FIFOs 824a and 824b in shader export modules 804a and 804b. The synchronization of data and events in shader export modules is described in relation to FIG. above. Subsequently, the data is stored in the logical ring buffers 828 and the events are input to a switch event FIFO 826 of the crossbar switch 802. According to an embodiment, the interface between each shader export module and crossbar switch can include 8 32-bit data busses, and one or more busses to exchange event data. The synchronization of events and data in the crossbar switch can be performed, for example, as described in relation to FIG. 2 above. Each memory controller subsequently writes the data from its associated logical ring buffer to the destination memory. When all data associated with a particular thread wavefront has exited the switch, the wave event associated with that thread wavefront is released. The wave event, and other events that that occur later than the wave event, can then be distributed to various clients, such as sequencer 808, command processor 812, or VGT 814, via client distribution module 816. Client distribution module, according to an embodiment, can reside within the crossbar switch 802 and includes the functionality to keep track of clients that require notification of particular types of events and the functionality to distribute the particular events to those clients.

Figure 9:
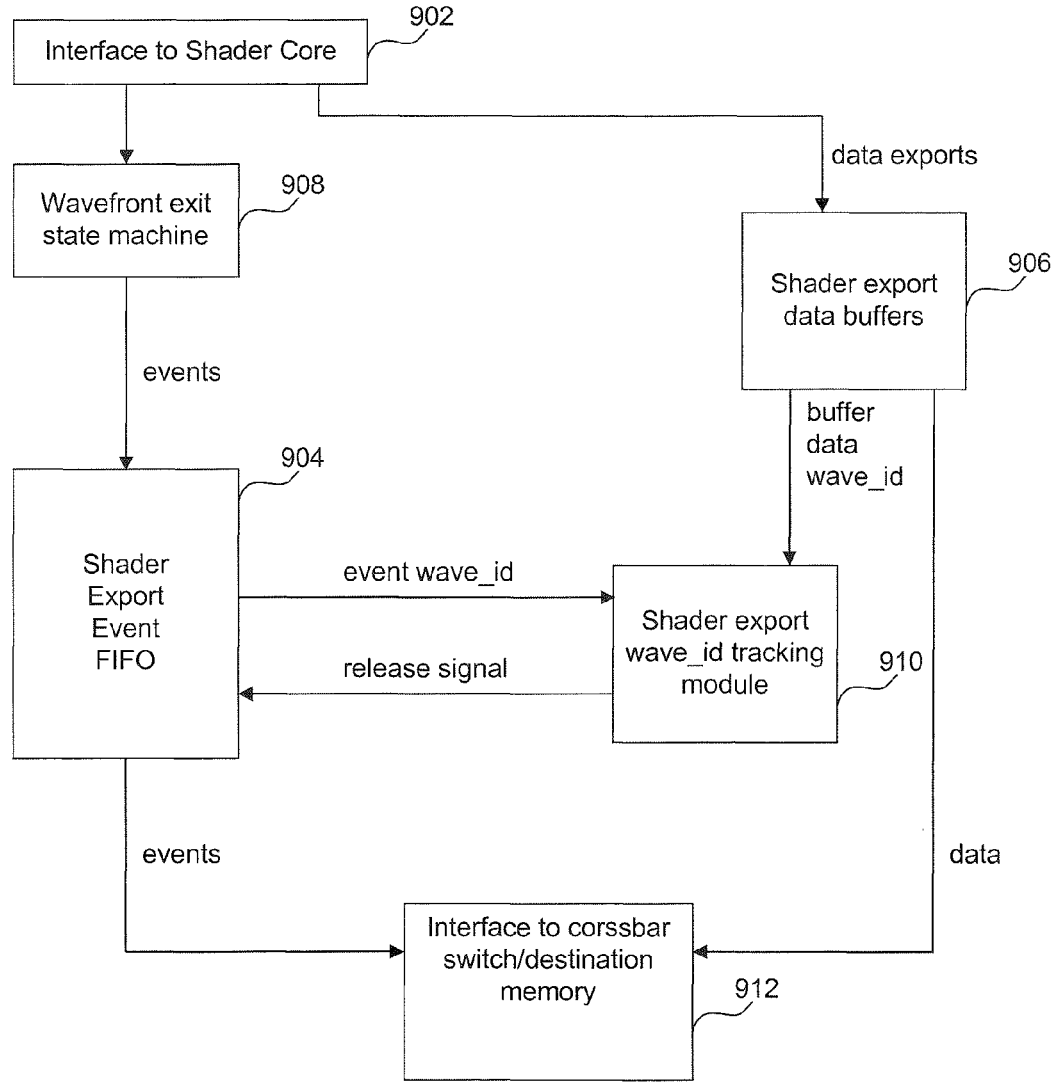
FIG. 9 is a block diagram illustrating logic components for synchronizing thread wavefront events and data in a shader export module, according to an embodiment of the present invention.

FIG. 9 illustrates a system 900 within a shader export module to synchronize thread wavefront events and data. In an embodiment, each shader export module that is coupled between a shader core and a destination memory can include system 900 in order to synchronize the events and data associated with thread wavefronts.

System 900 includes an interface to shader core 902, a shader export event FIFO 904, shader export data buffers 906, a wavefront exit state machine 908, a shader export wave identifier tracking module 910, and an interface 912 to a switch or destination memory. Interface to shader core 902 can comprise, for example, connections to 4 shader processing units. Interface 902 can also include a connection to a sequencer or to the shader core through which the shader export module receives events associated with thread wavefronts executing on the shader core.

The data received from the shader core through interface 902 are stored in shader export data buffers 906. Shader export data buffers 906 includes memory which can be pre-allocated to store such data. According to an embodiment, each data buffer of stored thread wavefront data has an attached wave identifier.

The events received from the shader core through interface 902 are stored in shader export event FIFO 904. According to an embodiment, the incoming events are processed by wavefront exit state machine 908. Shader export event FIFO 904 includes the functionality to enforce a FIFO queuing discipline. Each event enqueued to the shader export event FIFO includes an attached wave identifier.

Shader export wave identifier tracking module 910 includes the functionality to compare the wave identifiers associated with data in shader export data buffers 906 with the wave identifier of the wave event at the top of the event FIFO 904. According to an embodiment, this comparison is performed on each clock cycle. The comparison can be performed such that the existence of at least one match results in the shader export event FIFO not being popped. If none of the data buffers return a match with the wave event wave identifier, then a release signal can be transmitted from the wave identifier tracking module 910 to shader export event FIFO 904 to trigger the popping of the FIFO. The popping of the FIFO would result in the wave event being released, and following the wave event, other events occurring later than the wave event are also released.

The released events from shader export event FIFO and data from shader export data buffers, can be transmitted to a coupled crossbar switch enroute to destination memory via interface 912 to the crossbar switch.

Figure 10:
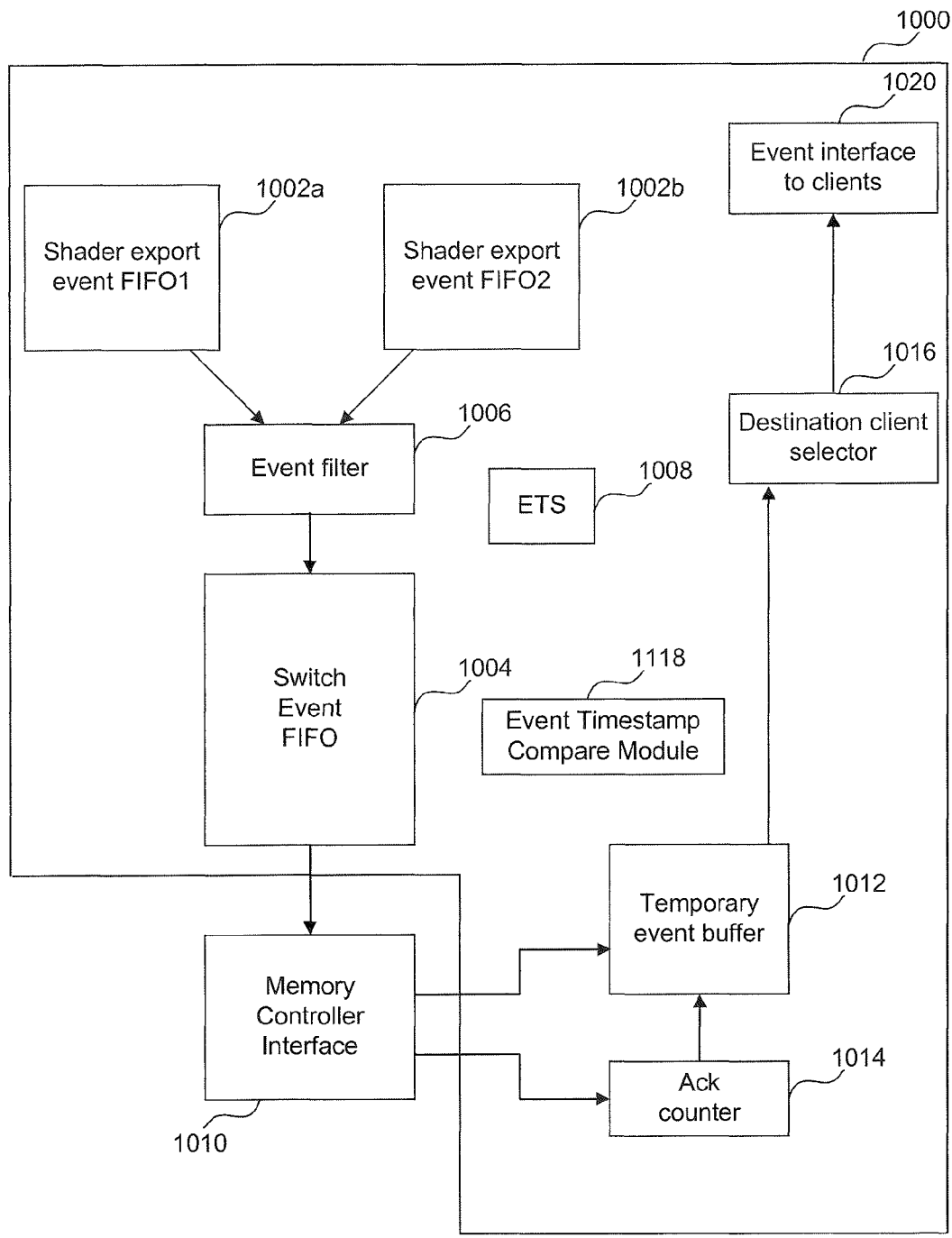
FIG. 10 is a block diagram illustrating logic components for synchronizing thread wavefront events and data in a switch, according to an embodiment of the present invention.

FIG. 10 illustrates a block diagram of a system 1000, within a crossbar switch, for performing synchronization of thread wavefront events and data. System 1000 includes interfaces to two shader export event FIFOs 1002a and 1002b. Interfaces 1002a and 1002b can, for example, couple system 1000 to shader export modules. Events released from shader export event FIFOs are sent to the crossbar switch over interfaces 1002a and 1002b.

The events incoming to the crossbar switch from shader export modules are subjected to filtering in a filtering module 1006. Filtering module receives the incoming events from all shader export modules. In an embodiment, filtering module includes the functionality to identify events sent by respective shader export modules that are duplicative. According to an embodiment, for each thread wavefront, each shader export module generates a wave event. The filtering module 1006 considers each of the wave events received from the shader export module, identifies duplicates, and sends only one event representative of the wavefront image to the switch. The events that are filtered or otherwise exited from the filter module 1004 are then enqueued to a switch event FIFO located, for example, within a switch. As described above, the switch event FIFO includes the functionality to enforce a FIFO queuing discipline.

According to an embodiment, events and data entering the crossbar switch would be timestamped, for example, with an individual timestamp generated by the event timestamp (ETS) module 1008. The ETS module 1008 includes the functionality to keep a running count. According to an embodiment, each data incoming to the switch is timestamped by the ETS with its current value. Events, such as the wave event, are also timestamped with the current value of the ETS. According to an embodiment, the ETS counter is incremented when a wave event is processed, after attaching the current value of the current ETS counter value to the wave event. In this manner, all data associated with a particular thread wavefront have event timestamps that correspond to the event timestamp value of the wave event that is enqueued in the event FIFO. The timestamped data is buffered in the logical ring buffer, for example, from logical ring buffers 828a-828p, that is associated with the destination memory area for that data.

According to an embodiment, on every clock cycle or a multiple thereof, an event timestamp comparing module 1118 compares the event timestamps associated with the wave event at the top of the switch event FIFO 1004 with the timestamps of the data buffered in the logical ring buffers. If there is no match, the wave event, and other events occurring later in time than the corresponding wave event, if any, are released from the event FIFO.

The released events can be temporarily held in a temporary event buffer 1012. The temporary event buffer 1012 can be a FIFO buffer or can enforce another queue discipline. The temporary event buffer 1012 can be used to keep the events that are released from the switch event FIFO 1004 until such time that a determination is made as to whether the events can be sent to any client modules that requested the respective event.

When a wave event is released from the switch event FIFO 1004, an acknowledgment request specifying the timestamp associated with the event is sent to all memory controllers through memory controller interfaces 1010. Each memory controller returns an acknowledgement when the data associated with the specified timestamp and/or wave event from its logical ring buffer. Ack counter module 1014 receives the acknowledgement messages from the memory controllers. When acknowledgement messages have been received from all the memory controllers, ack counter module 1014 signals the temporary event buffer 1012 to release the corresponding event.

The events released from the temporary event buffer 1012 are processed by a destination client selector module 1016. The destination client selector module 1016 determines which clients are to receive the event, and distributes the event to those clients through event interface to clients 1020.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the invention as described herein.

Embodiments of the present invention yield several advantages over conventional interfaces between shader cores and destination memory. As noted earlier, conventional systems suffered performance degradations due to having thread wavefronts stall until data from a previous thread waveform has been completely written to destination memory. Embodiments of the present invention can yield substantial improvements in performance by synchronizing thread wavefront events and data through the entire process of writing the thread outputs to destination memory.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments; based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for synchronizing one or more thread wavefronts and associated events, comprising:
   inserting, into an event synchronizer, a first event associated with first data output from a first thread wavefront, wherein the event synchronizer is configured to release the first event before releasing events inserted subsequent to the first event; and
   releasing the first event from the event synchronizer after the first data is stored in a memory.

2. The method of claim 1, further comprising:
   providing the released first event to one or more client modules.

3. The method of claim 1, further comprising:
   inserting, into the event synchronizer, one or more second events associated with a second wavefront configured to be executed after the first wavefront; and
   releasing the one or more second events from the event synchronizer after the releasing of the first event.

4. The method of claim 3, further comprising:
   executing the second wavefront according to the released one or more second events.

5. The method of claim 1, wherein the event synchronizer includes a first-in-first-out (FIFO) queue.

6. The method of claim 1, further comprising:
   monitoring the first data in one or more buffers before the first data is stored in the memory; and
   detecting, based on the monitoring, the completion of storing the first data in the memory.

7. The method of claim 6, wherein the monitoring comprises:
   determining an identifier associated with data in the one or more buffers; and
   comparing the first event and the data in the one or more buffers based on the identifier.

8. The method of claim 1, further comprising:
   maintaining an event timestamp counter associated with events inserted into the event synchronizer; and
   attaching an event timestamp from the event timestamp counter to the first event before inserting into the event synchronizer.

9. The method of claim 8, further comprising:
   writing respective ones of the first data to one or more buffers in a crossbar switch coupling a plurality of shader export buffers to the memory via one or more memory controllers; and
   writing the respective ones of the first data from the one or more buffers to the memory.

10. The method of claim 9, further comprising:
    attaching the event timestamp to respective ones of the first data before writing to the one or more buffers;
    comparing timestamp values of the first event and the first data in the one or more buffers; and
    determining, based on the comparison, completion of storing the first data to the memory.

11. The method of claim 10, further comprising:
    requesting one or more memory controllers coupled to outputs of the crossbar switch for acknowledgement messages when the one or more memory controllers have completed storing of the first data to the memory; and
    determining completion of storing the first data to the memory based upon the acknowledgment messages received from the one or more memory controllers.

12. The method of claim 11, further comprising:
    determining one or more clients to be notified of at least one of the first event or the one or more second events; and
    notifying the one or more clients of the at least one of the first event or the one or more second events.

13. The method of claim 8, further comprising:
    inserting the first event into as shader export event synchronizer, wherein the shader export event synchronizer is configured to release the first event before releasing events inserted into the shader export event synchronizer after the first event; and
    releasing the first event from the shader export event synchronizer after the first data is sent to the crossbar switch.

14. The method of claim 13, further comprising:
    inserting, into the shader export event synchronizer, the second events; and
    releasing the second events from the shader export event synchronizer after the releasing of the first event.

15. The method of claim 13, further comprising:
filtering the released first event.

16. A system for synchronizing one or more thread wavefronts and associated events, comprising:
a shader core comprising a plurality of processing units configured to execute a first wavefront outputting a first data;
a wave event generator coupled to the shader core and configured to generate a first event associated with the outputting of the first data;
an event synchronizer configured to release the first event before releasing events inserted subsequent to the first event;
a switch coupled to the shader core and a memory, and configured to:
insert the first event into the event synchronizer; and
release the first event from the event synchronizer after the first data is stored in the memory.

17. The system of claim 16, wherein the switch is a crossbar switch, comprising:
a plurality of ring buffers, each corresponding to a respective memory controller;
a plurality of interfaces to the shader core, wherein each respective interface to shader core is configured to write to any one of the plurality of ring buffers; and
a plurality of interfaces to the respective memory controllers.

18. The system of claim 17, wherein the crossbar switch further comprises:
an event timestamp module configured to:
maintain an event timestamp counter associated with events inserted into the event synchronizer;
attach an event timestamp from the event timestamp counter to the first event before inserting into the event synchronizer;
attaching the event timestamp to respective ones of the first data before writing to switch buffers;
comparing timestamp values of the first event and the first data in the switch buffers; and
determining, based on the comparison, completion of storing the first data to the memory.

19. The system of claim 17, wherein the crossbar switch further comprises:
a client notification module configured to:
determine one or more clients to be notified of at least one of the first event or one or more processing events; and
notify the one or more clients of the at least one of the first event or the one or more processing events.

20. The system of claim 17, wherein the crossbar switch is further configured to:
request one or more memory controllers coupled to outputs of the switch for acknowledgement messages when the one or more memory controllers have completed storing of the first data to the memory; and
determine completion of storing the first data to the memory based on the acknowledgment messages received from the one or more memory controllers.

21. The system of claim 16, further comprising:
one or more shader export modules coupled between the shader core and the switch, including:
a plurality of shader export data buffers configured to store the first data received from the shader core;
a shader export event synchronizer configured to:
insert a shader export first event associated with the first data into a shader export event synchronizer, wherein the shader export event synchronizer is configured to release the shader export first event before releasing events inserted into the shader export event synchronizer after the first event; and
release the shader export first event from the shader export event synchronizer after the first data is sent to the switch.

22. A non-transitory computer readable storage medium storing instructions wherein said instructions when executed are adapted to synchronize one or more thread wavefronts and associated events using a method comprising:
inserting, into an event synchronizer, a first event associated with a first data output from a first thread wavefront, wherein the event synchronizer is configured to release the first event before releasing events inserted subsequent to the first event; and
releasing the first event from the event synchronizer after the first data is stored in the memory.

* * * * *